March 25, 1930.　　C. D. SEVERANCE ET AL　　1,752,112
SPIRIT LEVEL
Filed June 26, 1928
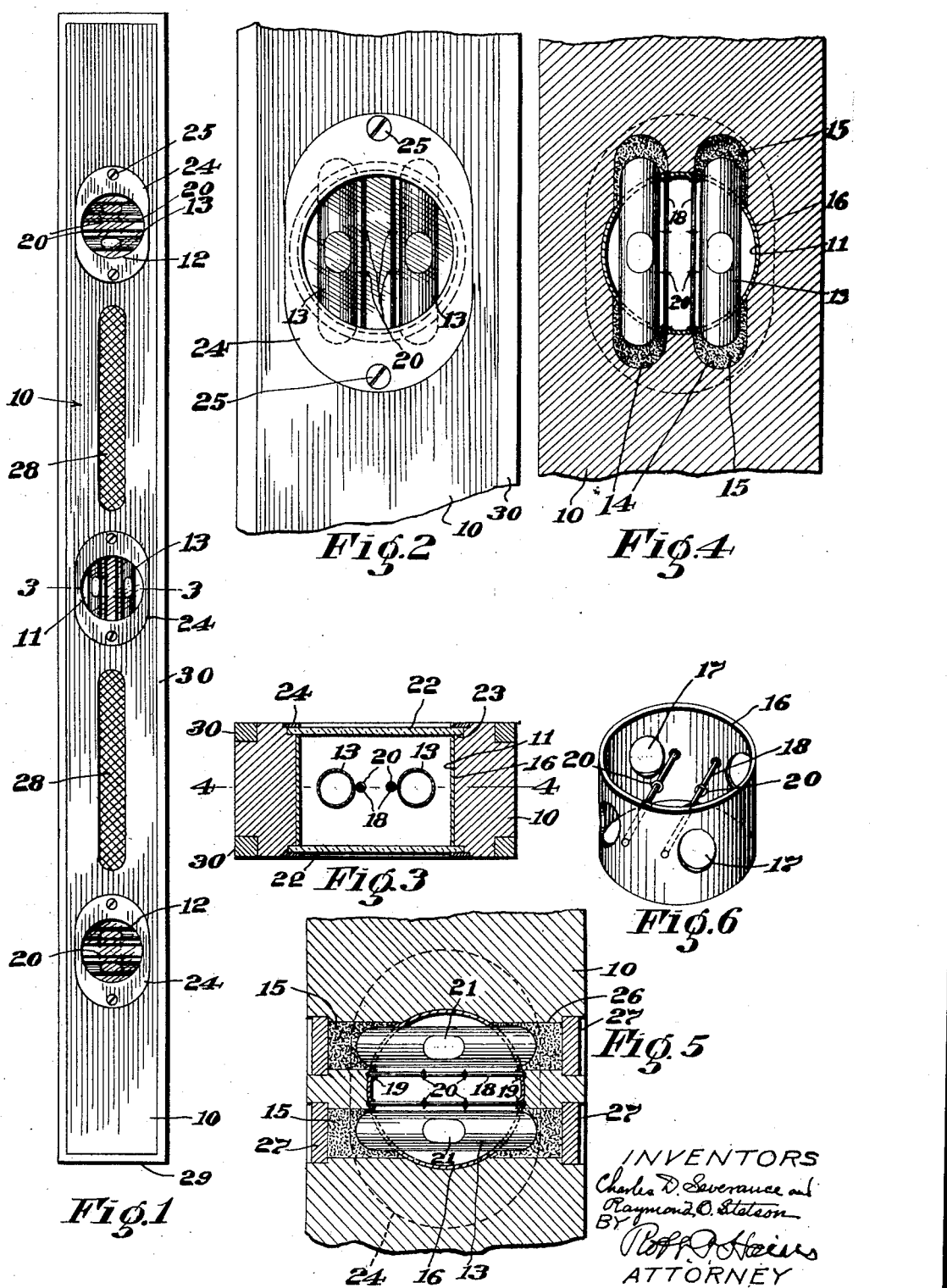

Patented Mar. 25, 1930

1,752,112

UNITED STATES PATENT OFFICE

CHARLES D. SEVERANCE AND RAYMOND O. STETSON, OF GREENFIELD, MASSACHUSETTS, ASSIGNORS TO GOODELL-PRATT COMPANY, OF GREENFIELD, MASSACHUSETTS, A CORPORATION OF MASSACHUSETTS

SPIRIT LEVEL

Application filed June 26, 1928. Serial No. 288,364.

This invention relates to spirit levels and more particularly to improvements in means for mounting the level-glass or tube upon the level stock.

It frequently happens that after a spirit level is constructed and placed in use the reading of the same changes due to warping or springing of the material of which the stock is formed, and it is therefore important to provide means whereby the reading of the level may be corrected.

The spirit levels now in use are therefore provided with various forms of tube holder for adjustably supporting the level-glass or tube upon the stock so that the tube may be adjusted to correct errors in the reading of the level, but it is found that these adjustable tube holding devices are not as dependable as the constructions in which the level-glass or tubes are set solid upon the stock.

Having in mind the foregoing the present invention relates to a simple and dependable spirit level construction in which the level-glass is set solid in the stock, and provision is made for correcting the reading of the level by adjusting an indicating means associated with the level-glass, rather than adjusting the glass as heretofore.

An important feature of the present invention resides in novel means for supporting an indicator adjacent the level-glass so that the indicator may be adjusted lengthwise of the glass to correct the reading of the level, and a further feature of the invention resides in a sleeve mounted within the tube receiving bore of the level stock and which serves to form a lining for the bore and also constitutes the support for the indicating means.

Other features of the invention and novel combination of parts in addition to the above will be hereinafter described in connection with the accompanying drawings which illustrate one good practical form of the invention.

In the drawings, Fig. 1 is a side elevation of a level embodying the features of the present invention;

Fig. 2 on an enlarged scale is a side elevation of the central portion of the level of Fig. 1;

Fig. 3 is a transverse sectional view taken on the line 3—3 of Fig. 1;

Fig. 4 is a longitudinal sectional view through the central portion of the level taken on the line 4—4 of Fig. 3;

Fig. 5 is a sectional view similar to Fig. 4, showing the level tubes near an end of the level; and Fig. 6 is a perspective view of a sleeve to be described.

The level stock 10 may be formed of wood or metal and is preferably provided with a central tube receiving bore 11 and also with the tube receiving bores 12 disposed near the opposite ends of the level as is usual. Each of these bores is adapted to receive a single level-glass or tube 13, or a pair of such glasses or tubes as shown, and the level-glasses 13 disposed in the central portion 11 extend lengthwise of the level 10 for use in leveling horizontal surfaces, while the tubes 13 disposed in the end bores 12 extend transversely of the level for truing vertical surfaces, as is usual.

As above stated it is deemed advisable to mount the level-glasses or tubes 13 solid in the stock 10 rather than adjustably therein, as has been customary heretofore, and to this end, in accordance with the present invention, the material of which the stock 10 is formed is cut away adjacent the central bore 11, as will be apparent from Fig. 4 to form the tube receiving recesses 14. The ends of the tubes 13 extend into these recesses and are set solid in plaster-of-Paris 15, or other plastic material capable of setting hard.

It is desirable to provide the central bore 11 with a lining or wall of pleasing appearance and which will also present a bright surface that will facilitate reading of the level. This is accomplished by providing the sleeve 16, best shown in Fig. 6 and which is adapted to fit snugly within the bore of the level stock. This sleeve may be formed of metal and preferably has its inner face polished to provide a bright light-reflecting surface. The holes 17 are formed in the sleeve 16 to provide clearance spaces through which the ends of the level-glasses or tubes 13 may extend into the beds of plastic material 15; the construction being such that the tubes are supported by the plastic material 15 rather than by the sleeve 16, but the latter helps to retain the plastic material in place in the recesses 14 in that the outer face of the sleeve forms an abutting surface which helps to confine the plastic material within the recesses 14, and when this plastic material sets hard against the outer face of the sleeve 16 it helps to retain the sleeve in place within the bore of the stock in which it is mounted.

The sleeve 16 serves not only to form a pleasing lining or finished wall for the bore of the stock, but performs the more important function of supporting the indicating devices adjacent the level-glasses to facilitate the reading of these glasses. To this end, in accordance with the present invention, adjacent each tube 13 is mounted a bead supporting rod 18 the ends of which rod fit tightly in holes formed in the opposite sides of the sleeve 16. These rod receiving holes are preferably formed by punching the metal of the wall 16 inwardly as indicated by 19, to thereby increase the area of the supporting surface which engages the ends of the rod 18, and the ends of these rods are preferably soldered or otherwise rigidly secured to the sleeve. Each rod 18 is provided with a bead or pair of beads 20 which are snugly mounted upon the supporting rod so that they fit tight upon the rod, but may be forced lengthwise thereof to correct the reading of the level; the object of these beads is to indicate the position of the bubble 21 when the level is in a true horizontal or vertical position, as will be apparent from the drawing.

It will be apparent from the foregoing that the means herein described for supporting the level-glasses or tubes 13 upon the stock and for correcting the reading of the level are extremely simple and constitute an inexpensive and reliable construction, and it will be apparent that if adjustment of the beads 20 lengthwise of their supporting rods is necessary to correct the reading of the level or accommodate changes in the size of the bubble such adjustment may readily be made by placing a screw driver or other instrument against the bead and forcing it in the desired direction lengthwise of the rod 18.

It is desirable to provide the tube receiving bores of the stock with the windows 22 to protect the level-glasses or tubes 13 and to exclude dirt and dust from these tubes and associated parts, and to this end, in the construction shown, an annular recess 23 is formed in each face of the stock 10 about the bore to provide a seat for the marginal edges of the windows 22, as will be apparent from Fig. 3. These windows are secured in place by the cover plates 24 which preferably are mounted in depressions formed in the opposite faces of the stock 10 so that they lie approximately flush with the side faces of the stock, and these cover plates may be secured in place by screws 25 which extend through the cover plates and into the stock. The length of the sleeve 16 is preferably such that the opposite ends of said sleeve will lie adjacent the inner faces of the windows 22, as will be apparent from Fig. 3. The construction of the windows just described and means for securing these windows in place is such that the windows may readily be removed to facilitate the cleaning of the inner face of the glass 22, or for renewing the glass, when broken.

The construction so far described relates more particularly to the means shown in Figs. 2, 3 and 4 for supporting the level-glasses 13 in the central bore 11 of the stock. The means herein shown for mounting the tubes 13 in the end bores 12 of the stock is exactly the same as employed in connection with the central bore 11 except that instead of cutting the stock away to form the recesses 14 adjacent the central bore, the recesses or pockets for receiving the plastic material are formed adjacent the end bores 12 by drilling holes 26 inwardly through the opposite edges of the level stock, as will be apparent from Fig. 5.

The level-glass 13 may be inserted through these holes into the position in which they are shown in Fig. 5 and are set solid in the stock by packing the plastic material 15 within the holes 26, after which the ends of the holes may be closed by the metal disks 27 which fit tightly in the enlarged recesses formed in the opposite edges of the level stock at the ends of the holes 26. The type of sleeves shown in Fig. 6, and the indicating means associated therewith, is used in the central bore 11 and also in the end bores 12, thus simplifying the level construction.

The level stock may be provided with the depressions 28 formed in its opposite faces which constitute hand grips for facilitating handling of the level, and if the level stock is formed of wood the ends thereof may be protected by the metal plates 29 while the edges of the stock may be protected by the metal strips 30 disposed in recesses formed lengthwise of the stock.

It will be apparent from the foregoing that the level-glasses or tubes 13 are not supported by the sleeve 16 but are set solid in the level stock, this being the most reliable form of mounting for level-glasses known. It will also be understood that the primary function of the sleeve 16 is to support the bead carrying rods 15 adjacent the level glasses so that the beads may be moved lengthwise of the rods to correct the reading of the level.

What is claimed is:—

1. A spirit level comprising in combination a stock having a sleeve retaining bore and recesses formed in the stock adjacent the bore, plastic material deposited in said recesses, a sleeve rigidly mounted in said bore and provided with clearance holes of larger diameter than the diameter of the level-glasses through which the ends of level-glasses may project, a pair of level-glasses mounted in said bore to extend across the sleeve and each glass having its ends projecting through the clearance holes in the sleeve and set solid in the plastic material in said recesses, a pair of bead carrying rods supported by said sleeve to extend across the sleeve adjacent the level-glasses, and a bead mounted on each rod and movable lengthwise thereof to the desired position of adjustment.

2. A spirit level comprising in combination, a stock having a level-glass receiving bore and recesses formed in the stock adjacent the bore, plastic material deposited in said recesses, a pair of level-glasses mounted in said bore to extend across the bore and each glass having its ends projecting into the recesses and set solid in the plastic material therein, a bead supporting sleeve mounted in said bore, a pair of bead carrying rods supported by the sleeve to extend across the same adjacent the respective level-glasses and each rod having its ends firmly secured to the sleeve, and beads mounted on the rods and movable lengthwise thereof to the desired position of adjustment.

3. A spirit level comprising in combination, a stock having a sleeve-receiving bore and recesses formed in the stock adjacent the bore, plastic material deposited in said recesses, a sleeve rigidly mounted in said bore and provided with clearance holes of larger diameter than the diameter of the level-glasses through which the ends of a level-glass may project, a level glass mounted in said bore to extend across the sleeve with its ends extending through the clearance holes in the sleeve into said recesses and set solid in the plastic material therein, a bead carrying rod supported by the sleeve to extend across the same adjacent the level-glass and having its ends rigidly secured to the sleeve, and a bead adjustably mounted on said rod.

4. A spirit level comprising in combination, a stock having a sleeve-receiving bore and recesses formed in the stock adjacent the bore, plastic material deposited in said recesses, a sleeve rigidly mounted in said bore and provided with clearance holes of larger diameter than the diameter of the level-glasses through which the ends of a level-glass may project, a level glass mounted in said bore to extend across the sleeve with its ends extending through the clearance holes in the sleeve into said recesses and set solid in the plastic material therein, a bead carrying rod extending across said sleeve adjacent the level-glass and having its ends penetrating the opposite sides of the sleeve and soldered thereto, and a bead mounted on the rod and movable along the same to different positions of adjustment.

5. A spirit level comprising in combination, a stock having a sleeve receiving bore and recesses formed in the stock adjacent the bore, plastic material deposited in said recesses, a sleeve rigidly mounted in said bore and provided with clearance holes of larger diameter than the diameter of the level-glasses through which the ends of a level-glass may project, a level-glass mounted in said bore to extend across the sleeve with its ends extending through the clearance holes in the sleeve into said recesses and set solid in the plastic material therein, a bead carrying rod supported by the sleeve to extend across the same adjacent the level-glass, a bead adjustable along said rod, a glass window at each side of the stock for protecting the level-glass in the bore, and a cover plate removably secured over each window to hold the windows in place.

6. A spirit level comprising in combination, a stock having a level-glass receiving bore and recesses formed in the stock adjacent the bore, plastic material deposited in said recesses, a level-glass mounted in said bore to extend across the bore with its ends projecting into the recesses and set solid in the plastic material therein, a bead supporting sleeve mounted in said bore, a bead carrying rod supported by the sleeve to extend across the sleeve adjacent the level-glass and having its ends firmly secured to the sleeve, and a bead mounted on the rod and movable lengthwise thereof to the desired position of adjustments.

In testimony whereof, we have signed our names to this specification.

CHARLES D. SEVERANCE.
RAYMOND O. STETSON.